United States Patent [19]  [11] 4,253,020
Michel et al.  [45] Feb. 24, 1981

[54] APPARATUS FOR MEASURING PROJECTILE VELOCITY

[75] Inventors: Dieter Michel, Traunstein; Walter Schmitt, Sondermoning, both of Fed. Rep. of Germany

[73] Assignee: Dr. Johannes Heidenhain GmbH, Traunreut, Fed. Rep. of Germany

[21] Appl. No.: 966,365

[22] Filed: Dec. 4, 1978

[30] Foreign Application Priority Data

Dec. 7, 1977 [DE] Fed. Rep. of Germany ....... 2754420

[51] Int. Cl.³ ............................................. G01P 3/36
[52] U.S. Cl. .................................. 250/222 R; 356/28
[58] Field of Search .......................... 356/28; 326/178; 250/221, 222, 560, 561

[56] References Cited
U.S. PATENT DOCUMENTS

| 2,409,672 | 10/1946 | Fischer et al. |
| 2,769,492 | 11/1956 | Ostergren |
| 3,495,893 | 2/1970 | Geusic et al. |
| 3,524,354 | 8/1970 | Frank et al. |
| 3,675,030 | 7/1972 | Tanenhaus |
| 3,695,749 | 10/1972 | Stapleton |
| 3,830,568 | 8/1974 | Allen |
| 3,865,487 | 2/1975 | Andermo |
| 3,989,378 | 11/1976 | Heitmann et al. |
| 4,155,647 | 5/1979 | Michel |

FOREIGN PATENT DOCUMENTS 2163234 6/1973 Fed. Rep. of Germany .
2610708 9/1978 Fed. Rep. of Germany .
2259371 8/1975 France .

OTHER PUBLICATIONS

Jenkins et al., "Fundamentals of Optics", 3rd Ed., McGraw-Hill, 1957, pp. 239-240.

Primary Examiner—David C. Nelms
Assistant Examiner—Darwin R. Hostetter
Attorney, Agent, or Firm—Hume, Clement, Brinks, Willian & Olds, Ltd.

[57] ABSTRACT

An apparatus for detecting the passage of a moving object such as a truncated stern projectile includes a laser light screen, a photo sensor, and a signal processor. The intensity signal produced by the photo sensor is processed to generate an output pulse at the instant when the first time derivative of the intensity is greatest. For truncated stern projectiles this occurs when the projectile exits the light screen.

3 Claims, 5 Drawing Figures

APPARATUS FOR MEASURING PROJECTILE VELOCITY

BACKGROUND OF THE INVENTION

The present invention is directed to an apparatus for measuring projectile velocity and, in particular, to an apparatus for measuring the velocity of truncated stern projectiles by means of a light screen, a photo sensor, and a signal processor.

Light screens and in particular laser light screens for ballistic measurements are known to the art. See, e.g., West German DT-OS No. 26 10 708. In such arrangements of the prior art, a light screen is interrupted at the passage of a projectile. A photo sensor is used to monitor the light screen, and the modification of the photo sensor signal associated with the passage of a projectile through the light screen is used to start and stop a time counter. The time difference between the entry of the projectile into a first light screen (which triggers a start signal for the time counter) and the entry of the projectile into a second light screen (which triggers a stop signal for the time counter) is used to determine the projectile's speed. The photo sensor signal associated with the passage of a projectile through a light screen has a curve which is a function of the geometry of the projectile. Here, the trace of the curve corresponds to the signal obtained from the photo sensor as a function of time.

A precise measure of the instant of passage of the projectile through the light screen cannot be determined merely by triggering the time counter at an undetermined point during the deviation of the photo sensor signal. Because of the length of the projectile, a specific amount of time elapses between entry of the projectile into the light screen and its exit therefrom. Within the period of this passage time, the instant of passage is thus undefined. As mentioned, a reproduceable measure of the instant of passage is needed to precisely start and stop the time counter.

SUMMARY OF THE INVENTION

The present invention is directed to an improved apparatus for measuring projectile velocity which precisely determines the point in time of projectile passage through a light screen in a reproduceable manner.

The apparatus of this invention operates to detect the point in the passage of a projectile through a light screen at which the rate of change of the photo sensor signal is greatest. This point is then used to trigger the operation of a time counter exactly. In the case of commonly used truncated stern projectiles, the steepest slope of the curve of the photo sensor output signal occurs when the projectile leaves the light screen.

A further advantage of the invention consists in the use of a voltage divider for the determination of the trigger threshold for a Schmitt-trigger. By means of this voltage divider, which in general is set at about 50 percent of the maximum deviation of the photo sensor signal, the trigger threshold can be adapted to various projectile geometries, thereby substantially eliminating premature triggering. Furthermore, a laser light source is particularly well suited as a light source for the light screen.

The invention itself, together with further objects and attendant advantages, will be best understood by reference to the following detailed description taken in conjunection with the appended drawings.

DETAILED DESCRIPTION OF A PREFERRED EMBODIMENT

Figure 1:
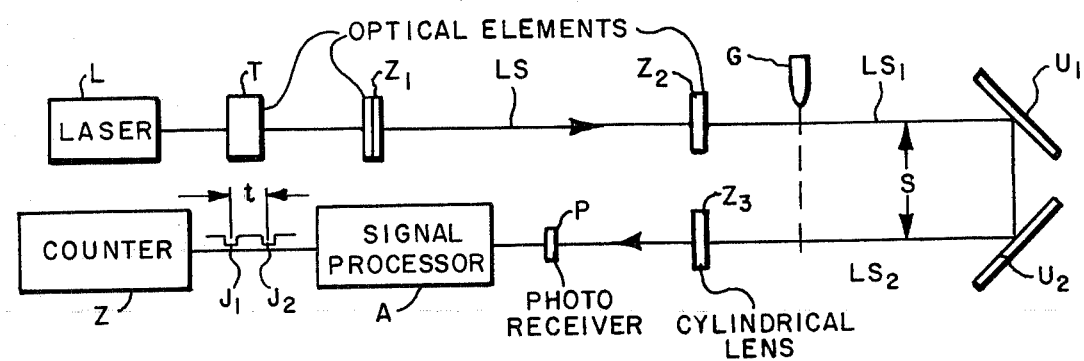
FIG. 1 is a block diagram of a preferred embodiment of the velocity measuring apparatus of this invention.
Figure 2:
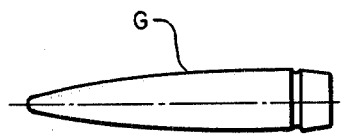
FIG. 2 is a plan view of a truncated stern projectile.

Referring now to the drawings, FIG. 1 represents a reflex light screen used for measuring the velocity of a projectile G. A laser light source L delivers a laser beam LS, which passes through the optical elements T, $Z_1$, and $Z_2$ and is expanded into a narrow laser light band or screen $LS_1$. At the mirrors $U_1$ and $U_2$ the laser light band $LS_1$ is deflected in such a manner that two parallel light bands $LS_1$ and $LS_2$ are formed separated by a precisely fixed distance, s. The laser light band $LS_2$ is focused by a cylindrical lens $Z_3$ onto an optical receiver P whose analog output signal is transformed in the signal processor circuit A into square wave impulses $J_1$ and $J_2$. The output of the signal processor circuit A is applied to an electronic counter Z which is started by the occurrence of the impulse $J_1$ and is stopped by the occurrence of the impulse $J_2$. The measured time interval between $J_1$ and $J_2$ is a measure of the speed of the projectile G for the given separation s between the two light bands $LS_1$ and $LS_2$. The projectile G, as represented in FIG. 2, has a form which is commonly used in a wide range of projectiles. The form of these projectiles is tapered to a point at the front and is truncated at the rear or stern.

Figure 3:
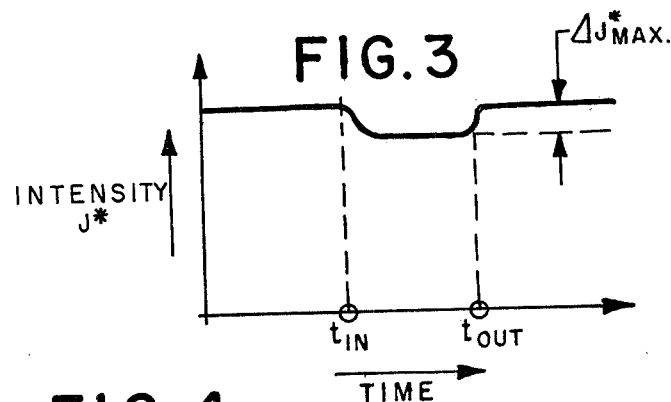
FIG. 3 is a diagram of the light intensity striking the optical receiver P of FIG. 1 as a function of time.

As a projectile such as the projectile G passes through the narrow laser light band $LS_1$, $LS_2$ of a light screen, the light intensity, $J^*$, striking the receiver P varies with time. A typical curve of $J^*$ as a function of time is shown in FIG. 3, in which $t_{in}$ represents the point in time at which the projectile G begins to penetrate the light band, and $t_{out}$ represents the point in time at which the stern of the projectile leaves the light band. $J^*_{max}$ characterizes the maximal deviation of the detected light during passage of the projectile G. The intensity curve of FIG. 3 also corresponds to the signal generated by the photosensor LD in the receiver P.

Figure 4:
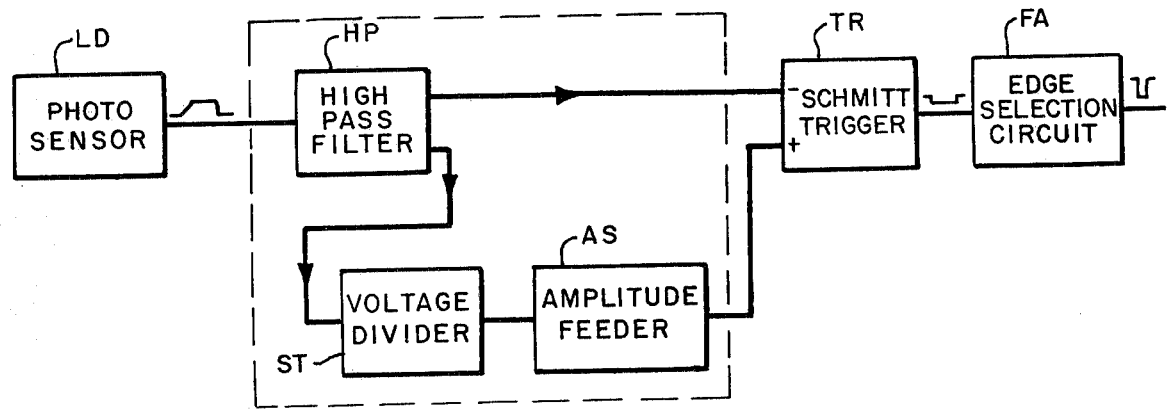
FIG. 4 is a block diagram of the signal processor circuit A of FIG. 1.

FIG. 4 represents a block diagram of the signal processor A. The signal coming from the photo sensor LD of the receiver P is filtered by a high pass filter HP to ensure that interference signals with low time derivatives $dJ^*/dt$ do not falsify the measurement results. Such interference signals can be produced by modulation of the light screen light source (net frequency), vibrations of the mechanical elements of the apparatus, stray light, as well as by other sources. The filtered signal from the high pass filter HP is divided and applied both to the difference input of a Schmitt-trigger TR, and to an amplitude feeder AS with a voltage divider ST. The output of the amplitude feeder is applied to the difference input of the Schmitt-trigger TR. In order to avoid error switching, the Schmitt-trigger TR has an hysteresis so that the remainder interference signals are not processed.

In the amplitude feeder AS, the amplitude value $J^*_{max}$ is output at least until the point in time $t_{out}$. The voltage divider ST forms the reference voltage for the trigger threshold. This reference voltage is generally set at about 50 percent of $J^*_{max}$ but can, however, for special requirements be adapted through modification of the divider ratios.

The following edge selection circuit FA generates a control impulse for the timing electronics (time counter Z) in response to the $t_{out}$-side of the output signal of the Schmitt-trigger TR.

Figure 5:
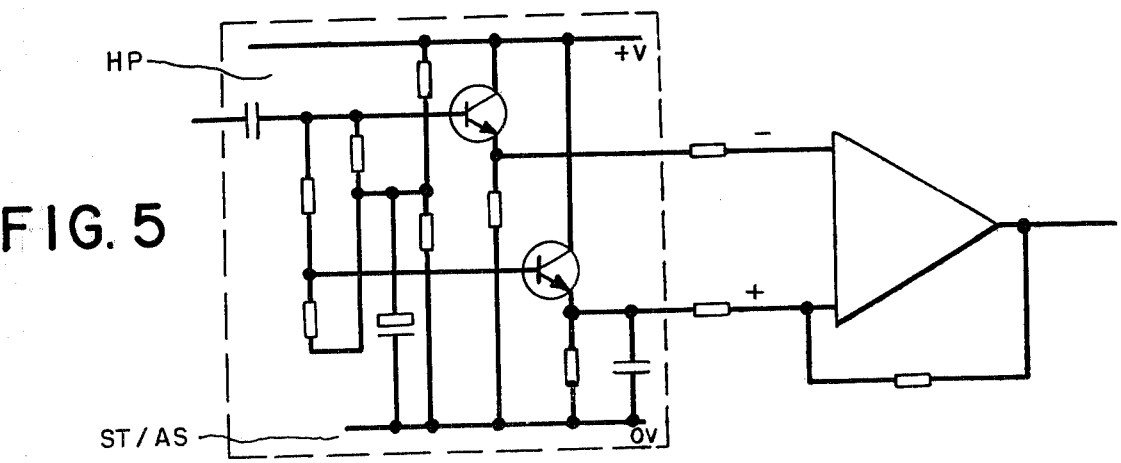
FIG. 5 is a circuit diagram for the high pass filter, the voltage divider, and the amplitude feeder of FIG. 4.

In FIG. 5 there is represented a preferred embodiment of a circuit which includes the high pass filter HP, the voltage divider ST as well as the amplitude feeder AS. It will be apparent to those skilled in the art that the circuit of FIG. 4 can also be realized by other circuit elements as, for example, an operation amplifier instead of the amplitude feeder and the like.

Of course, it should be understood that various changes and modifications to the preferred embodiment described herein will be apparent to those skilled in the art. For example, the present invention is not limited to an apparatus for measuring the speed of projectiles. Such a light screen can, for example, also be used for other ballistic measurements and for high speed photography. In arrangements in which no speed of a moving object is to be measured and in which only one single impulse has to be obtained, the deviation of the light band by a mirror is naturally not necessary. In this case, the other construction elements are installed in the required manner. Such changes and modifications are within the scope of the present invention and without diminishing its attendant advantages. It is, therefore, intended that such changes and modifications be covered by the following claims.

We claim:

1. An apparatus for detecting the passage of a moving object comprising:
   means for generating a light screen extending across the path of the object;
   photosensing means for generating an intensity signal in response to the intensity of the light screen;
   means for processing the intensity signal to generate an output signal when the first time derivitive of the intensity signal is at a maximum such that an output signal is generated when a truncated stern projectile exits the light screen.

2. The apparatus of claim 1 wherein the signal processing means includes
   means for setting a trigger threshold at about one-half of the maximum deviation of the intensity signal associated with the passage of the object through the light screen; and
   means, responsive to the trigger threshold setting means and the intensity signal, for generating an intermediate signal when the deviation of the intensity signal exceeds the trigger threshold; and
   means for generating the output signal in response to the following edge of the intermediate signal.

3. The apparatus of claims 1 or 2 wherein the generating means includes a laser for generating a laser light screen.

* * * * *